Feb. 24, 1942.          H. M. OLSON          2,274,210
                        PISTON RING SCALE
                        Filed July 1, 1940          4 Sheets-Sheet 2
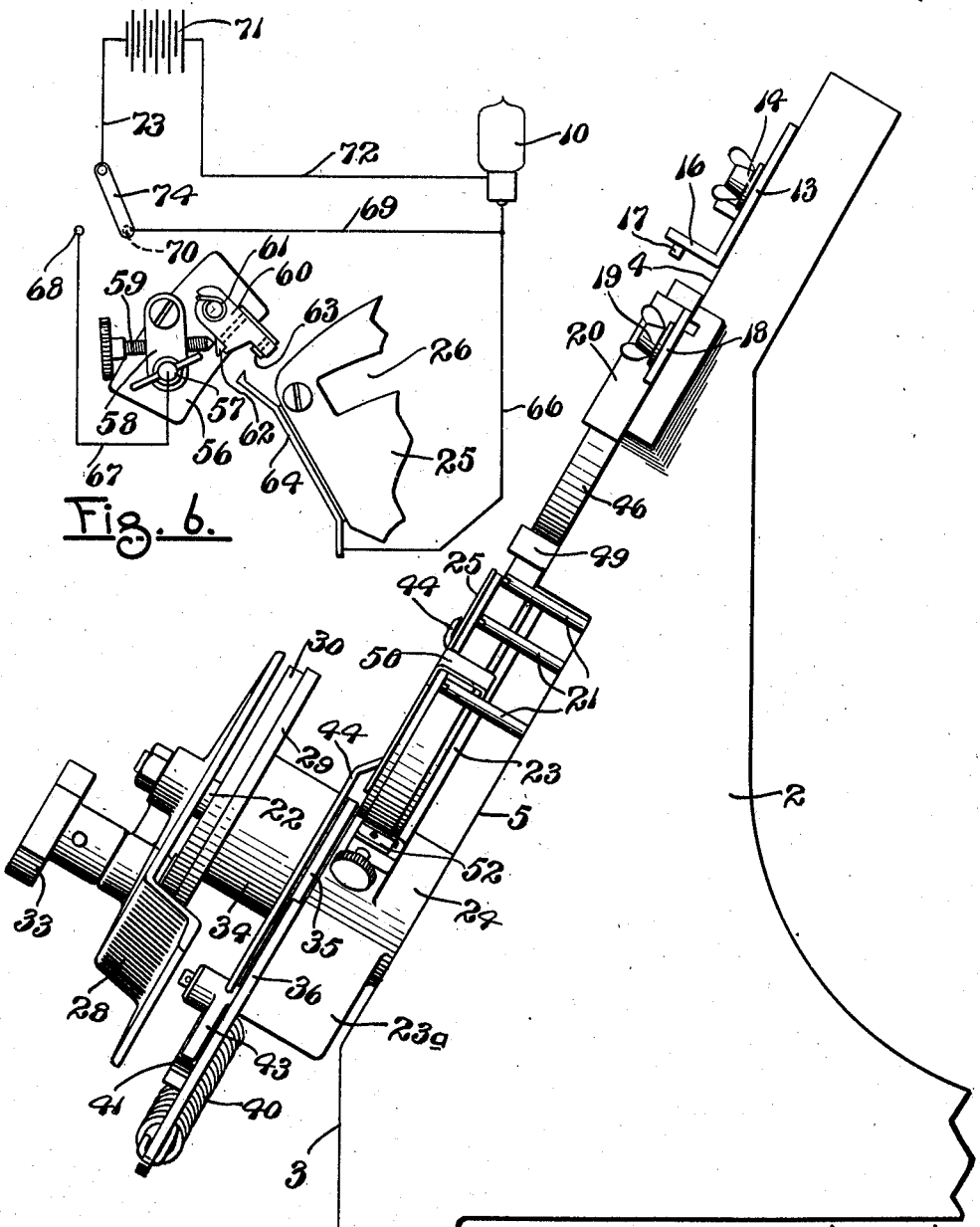

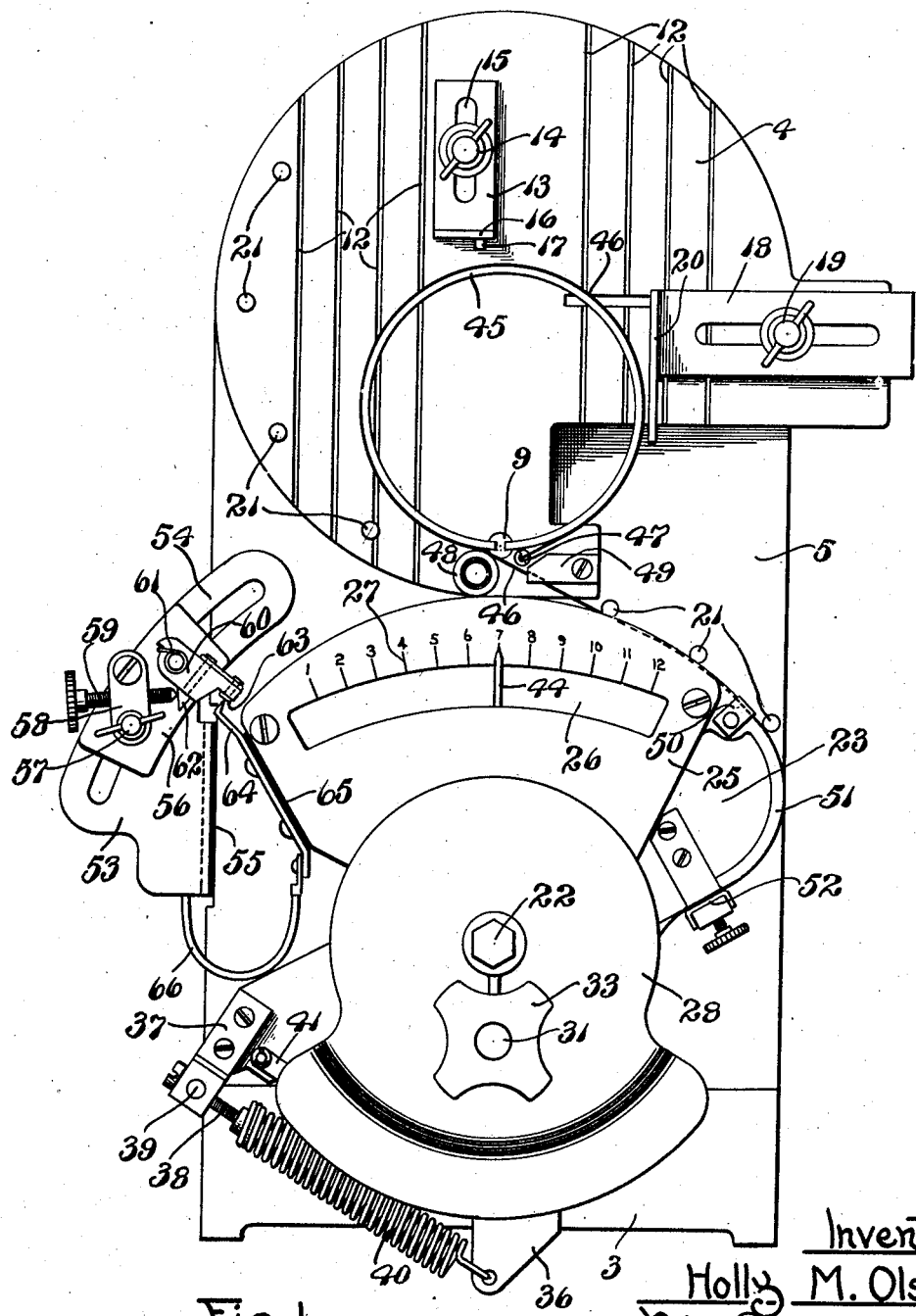

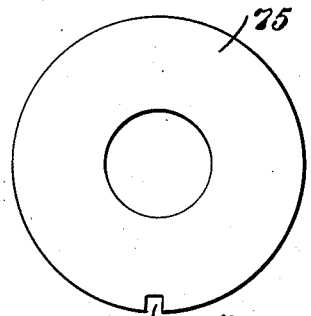
Fig. 7.
Fig. 3.
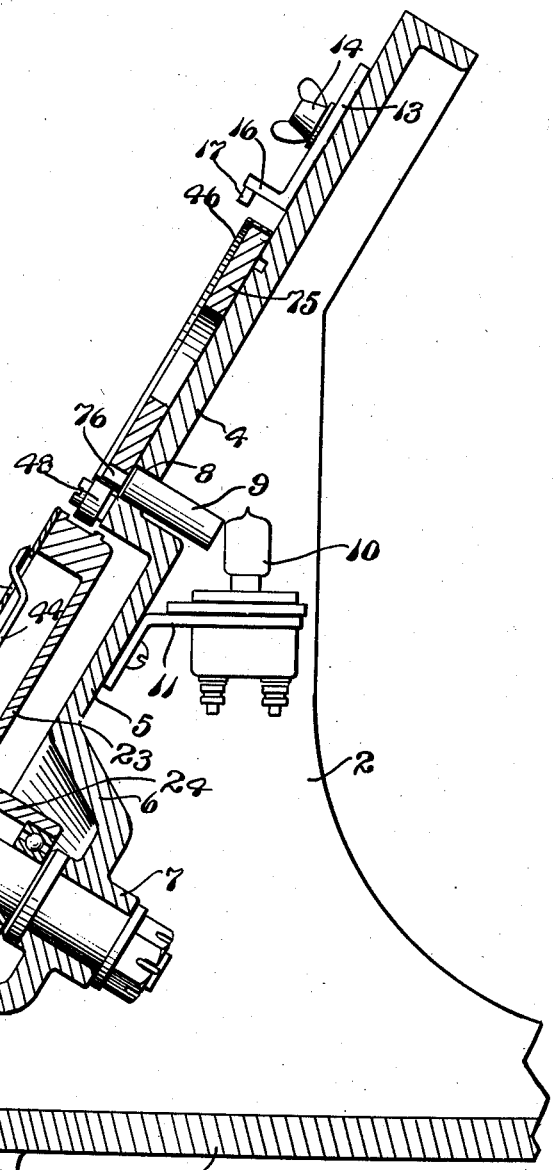

Feb. 24, 1942. H. M. OLSON 2,274,210
PISTON RING SCALE
Filed July 1, 1940 4 Sheets-Sheet 4

Inventor
Holly M. Olson
By Liverance
and
Van Antwerp
Attorneys

Patented Feb. 24, 1942

2,274,210

UNITED STATES PATENT OFFICE 2,274,210

PISTON RING SCALE

Holly M. Olson, Muskegon, Mich., assignor to Sealed Power Corporation, Muskegon, Mich., a corporation of Michigan Application July 1, 1940, Serial No. 343,315

12 Claims. (Cl. 265—19)

This invention relates to a novel machine for measuring the tension of piston rings.

Piston rings of the same size and type, that is, either solid or vented, should have substantially uniform characteristics. That is, for example, a plain compression snap ring should open a preselected distance at its parting and when substantially closed be of as near a perfectly circular outline as possible and require a predetermined force to close the ring substantially at its parting so that peripheral pressure of the ring against a cylinder wall will occur from the tendency of the ring to open at its parting. All rings of a particular size and type should be substantially uniform. A ring designed for a certain size of cylinder and with a diameter to correspond thereto and having selected cross sectional dimensions will also have specified with respect to it a tension which is a measure or a factor of the force required to substantially close the ring at its parting, as it is when in use. The rings made in accordance to such specifications must be tested for acceptance or rejection and conform substantially to the specifications laid down in all particulars within the tolerance limits of such specifications. It is accordingly a requisite that both in manufacturing the rings and also at the factory of an engine plant where the rings are inspected before installation in the engines that a percentage of the rings shall be tested to see that they conform substantially to the specifications to which they are made.

My invention is directed to a machine for testing the tension of the ring in both of the two manners in which piston rings in general are tested. The two methods are known to the trade as the flush weight test and the ring tension at bore diameter test. The machine is a weight scale by means of which rings may be selectively tested in either of the two ways of standard practice.

An object and purpose of my invention is to provide a weight scale testing machine of the character outlined which is adapted to and may be available for the tension test of piston rings of all or substantially all of the regular diameters and widths used in the internal combustion engines of motor vehicles at least, one machine being capable of being adjusted and set for a great many sizes and types of rings. In practice of course, the machine would be set for a ring of a predetermined size which, if it comes up to specifications, would have a desired and specified tension in it and in a run of such rings at the factory or in an inspection of such rings at the engine manufacturing plant the machine would be used over and over again for the one size of ring being made or being inspected for engine use. Then when a different size of ring was to be produced at the factory the machine would be adjusted for it. Of course in many cases there would be several of the machines of my invention used for the reason that one machine would not be sufficient to take care of the entire production at a factory manufacturing piston rings nor of all of the rings inspected at the engine building department of a large motor vehicle company.

A further object of the invention is to provide a machine which can test the rings in both of the standard manners previously stated, being changed over from a condition to test the rings by one method to the other by very simple adjustments of the machine.

A further object of the invention is to provide a machine of the character stated in which the operator thereof may make use of both hands, one to load and unload the machine with consecutive rings tested and the other to operate a conveniently located manually operated knob for applying tension.

A still further object of the invention resides in the very close location of the scale containing the graduations to the lighted window by means of which the closure of the ring gap or parting to its proper degree of closure may be seen, enabling the observer to view the degree of parting at the same time and by the same glance which reads the scale reading. Many other objects and purposes of the invention might be enumerated. One very important feature of my invention is that a true method of determining tension for the full circumference of the ring is provided with the machine of my invention so as to give a better and truer finding of the actual ring tension over other methods now commonly known as the diametrical flush method and the link method further reference to which will hereinafter appear.

The invention may be understood from the following description taken in connection with the accompanying drawings, in which:

Fig. 1 is a front elevation of a machine made in accordance with my invention.

Fig. 2 is a side elevation thereof.

Fig. 3 is a central vertical section through the machine from front to rear.

Fig. 6 is a diagrammatic view of the electric circuits used, and

Fig. 7 is a view of one of the master disks to which the machine may be adjusted for checking ring tension at the bore diameter.

Like reference characters refer to like parts in the several figures of the drawings.

Figures 4, 5:
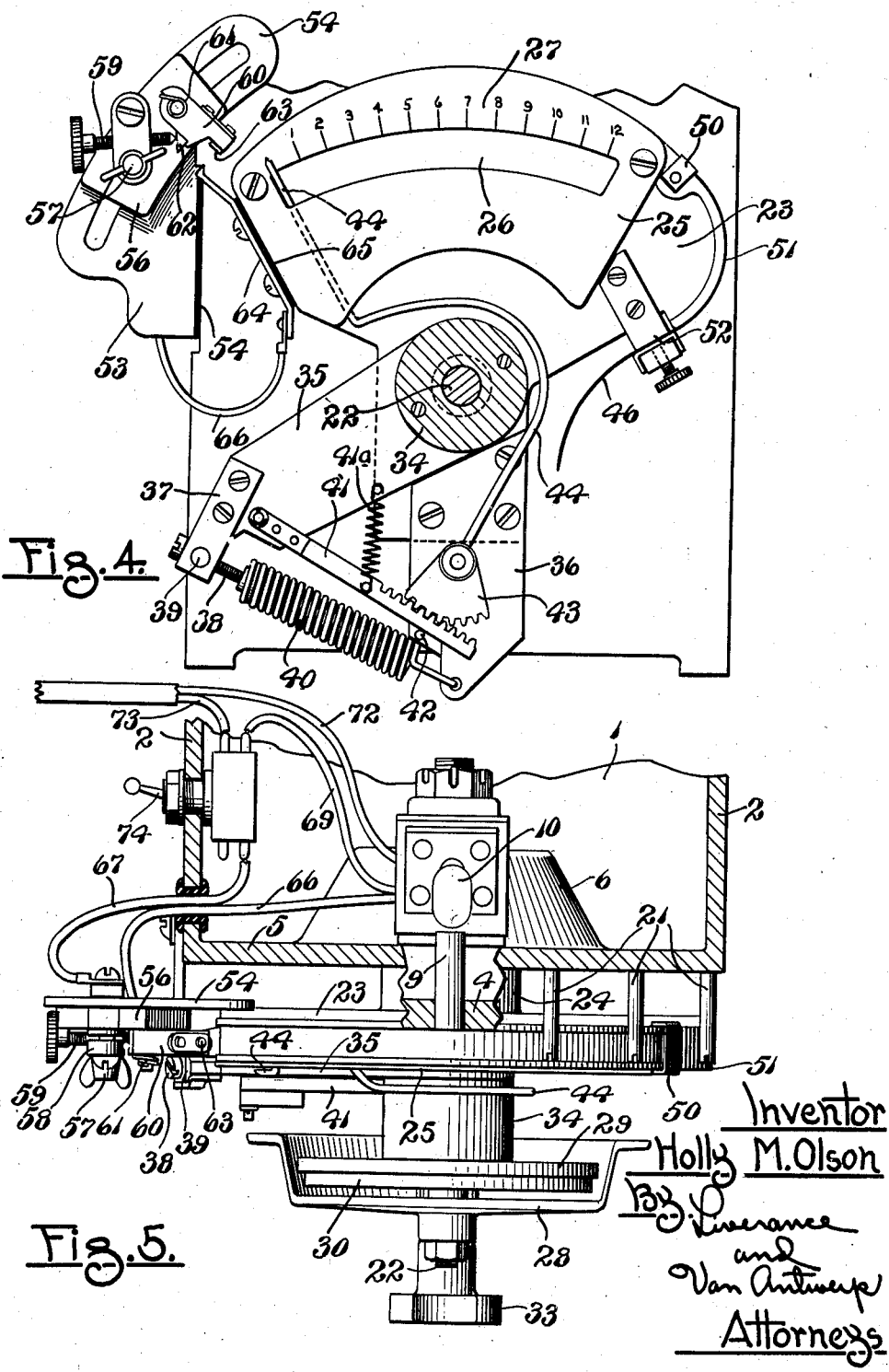
Fig. 4 is a fragmentary front elevation and partial section of the lower part of the machine, the section being back of the manual operating means.
Fig. 5 is a horizontal section substantially midway between the upper and lower ends of the machine.

In the construction of the machine a supporting casting is provided having a horizontal bottom 1, spaced apart vertical sides 2 connected at the front end at their lower portions by vertical section 3 from the upper edge of which the front of the machine extends upwardly in two sections, an upper section 4 and an intermediate section 5 which is set back of the upper section 4. Said upper section 4 of the front preferably has a curved upper outline in the arc substantially of a semi-circle. At the lower portion of the front section 5 and midway between the sides 2 there is an integral rearwardly extending depressed portion 6 of frustro-conical form at the center of which a sleeve 7 is provided as best shown in Fig. 3. Immediately above the intermediate front section 5 a circular opening 8 is made through the upper section 4 midway between the sides in which a cylindrical member 9 of transparent material is secured and back of which an electric light 10 is placed, the mounting of which is carried on a bracket 11 permanently secured to the rear side of the front section 5 as in Fig. 3. This provides a light window for viewing the gap in a ring being tested.

The forwardly projected upper section 4 of the support is vertically slotted in its face with a plurality of spaced apart slots 12 located symmetrically with respect to the central vertical plane of the machine. A plate 13 is vertically adjustable by means of a threaded pin and thumb nut 14 which pin passes through a vertical slot 15 in the plate 13. At its lower end the plate has a right angle outwardly extending arm 16 near the free edge of which a short pin 17 is secured as shown. At the right hand side a horizontally located slotted locating plate 18 is mounted on the front of the part 4 and may be adjustably secured by a threaded pin and thumb nut indicated at 19. At its inner end it is provided with an outwardly turned flange 20. A plurality of pins 21 located as best shown in Fig. 1 are mounted on and extend forwardly from the parts 4 and 5 of the support, the function of which as will later appear is to help retain the ring contracting steel band in position against aimless and undesired movement.

A cylindrical post 22 having a plurality of sections in its length of different diameters passes through the sleeve 7 at its inner end and is firmly anchored as shown in Fig. 3. A member 23 of cast metal has a sleeve 24 located over the intermediate portion of the post 22 and is mounted thereon for rocking movement by means of ball bearings. The lower part of the member 23 is of a relatively heavy and thick construction, as shown at 23a, serving as a counter-weight for the member 23 and to hold the upper portion thereof in its upper position normally by gravity. Said upper portion in outline is of sector-like form having a curved upper edge from which two spaced apart shallow ribs extend as shown in Fig. 3. The front portion of the upper part of the member 23 is recessed and over it a flat metal plate 25 is located and permanently secured, having an arc-shaped slot 26 therein, above which is an indicating scale 27 as shown in Fig. 1.

At the front end of the anchored post 22 a shield 28 is mounted and fixedly secured. Back of the shield a circular disk 29 is located through the central part of which the post 22 freely passes and at the front side of the disk an annular gear 30 is fixed. A short shaft 31 is rotatably mounted upon and passes through the shield 28 below the center thereof, on which at its rear end a pinion 32 is mounted in mesh with the annular gear 30. At the front end of the shaft 31 a knob 33 is connected for manual operation. The disk 29 is located against the forward end of a cylindrical block 34 through which the front end portion of the post 22 freely passes, and at the rear end of the block an arm 35 of flat metal is located, the three parts 29, 34 and 35 being permanently secured and held together by screws as shown in Fig. 3. The arm 35 normally extends downwardly and to the left substantially at an angle of 45° to the horizontal. (Fig. 4). An arm 36 of flat metal is permanently connected to and extends in a substantially vertical direction downwardly from a lower weighted section 23a of the member 23. Plates 37 are connected to the outer end of the arm 35 and a screw 38 passes through a block 39 mounted for rocking movement upon and between the outer ends of said plates 37. The screw 38 threads into an interiorly threaded collar to which one end a coiled compression spring 40 is secured, the other end of the spring having a connection to the lower end of the arm 36 (Fig. 4). It is evident that by turning the screw 48 the tension of the spring may be adjusted.

A rack bar 41 is pivotally connected at one end to the arm 35, as shown in Fig. 4, and extends downwardly and inwardly riding over a pin 42 on the arm 36. Rack teeth in the upper side of bar 41 engage with gear teeth on a sector shaped gear 43 pivotally mounted at its upper portion and from which a pointer 44 of the shape shown in Fig. 4 extends upwardly around the cylindrical block 34, back of the plate 25 and then is bent to pass through the slot 26 the free end of the pointer moving over the scale 27. A light coiled tension spring 41a connects the rack bar 41 with the arm 35 (Fig. 4) to maintain the rack in engagement with the gear section 43.

The piston ring 45 which is to be tested is shown as having a parting at one side and it is to be located against the front of the upper section 4 on the face of the machine. A flexible steel band 46 is anchored at one end on a post or pin 47 slightly to the right and below the window at 9 and is adapted to pass around the piston ring and over a roller 48 located to the opposite side of and below the window, thence extends over the right hand side of the rocking member 23 in the shallow groove between the upwardly extending ribs thereon, passing underneath a number of the pins 21 and under a guide block 49 secured to the face of the machine to one side and below the anchor post 47, which block is recessed at its under side for guiding and retaining the band. The band is carried underneath an inverted U-shaped stirrup 50 secured to the member 23 under which it will freely pass, and thence around a curved projecting portion 51 of the member 23 to a clamp 52 which may be manually released or operated to clamping position, whereby the band may be adjusted to a particular size of piston ring which is to be tested.

At the left hand side of the machine (Fig. 1) a supporting bracket 53 having an arc-shaped slotted upper portion 54 is permanently secured to the side of the machine but electrically insulated therefrom by insulation material 55. A block 56 is adjustably mounted on the slotted portion 54 and may be clamped and held in any adjusted position by a thumb nut 57 threaded onto a threaded screw which passes through the slot, said screw also passing through a member 58 secured to the block 56 positioned vertically and through which a substantially horizontal adjusting screw 59 is threaded. A contact carrying member 60 is pivotally mounted at one end on the block 56 and is normally impelled in a downward direction at its free end by a light spring 61. It carries a head 62 at its lower side against which the end of screw 59 bears and at its lower free end is provided with the contact 63. At its free end it is provided with an electric contact bar 64 secured to the rocking member 23 but insulated therefrom by insulating material 65 indicated in Fig. 1.

As shown in Figs. 5 and 6 one side of the light 10 is connected by a wire 66 with the contact bar 64. The block 58 is electrically connected by a wire 67 with one contact or post 68 of a two-way switch. A wire 69 connects the second post 70 of said switch with the wire 66. A source of electrical energy at 71 is indicated at one side thereof as being connected by the wire 72 with the other side of the light 10. The other side of the source of electrical energy 73 connects with the manually operable switch member 74. With the switch in the position shown in Fig. 6, the light will be lighted all of the time. When the switch is carried over to engage with the contact post 68 the light will be lighted only when contact 63 and the end of contact 64 are brought gether

Operation

In the first method which will be described in testing of rings for spring tension and to operate the scale apparatus for flush weight, the light 11 is lighted by having the electric switch in the position shown in Fig. 6 so that the lamp glows all the time. The length of the band 46 having been previously adjusted properly in connection with a master ring, knob 33 is manually operated to move the rocking member 23 counter-clockwise to open the band for receiving a ring to be tested. The ring is placed within the band, one end portion resting upon the anchor part 47 for one end of the band with the gap located at the front of the window at 9 through which the light glows. The hand knob is then turned in the opposite direction to draw upon and tension the band around the ring and substantially close the gap therein. When this occurs the pointer 44 will move over the scale 27 and should be substantially within the range of the specified amount for which the ring is to be designed when the ring gap is substantially though not quite closed. The ends of the ring at the gap are brought together so as to approach each other within a distance substantially of the order of .001 of an inch which the operator of the ring can judge very accurately as the light at the back showing through the transparent window provided by the member 9 will not only indicate when the gap is completely closed by no light passing between the ends of the ring, but when it is only slightly open it is readily distinguished. A ring when thus tested, with the scale pointer 44 substantially at the figure on the scale that the specifications for the ring states, is therefore a ring which has passed the test.

Master rings to which the production rings are compared are used in setting the machine for production rings of the same size and specifications of the master ring. In setting the machine for any particular ring the locater at 18 is moved out of the way to the right, the master ring is placed within the band and the machine operated to close the ring gap. Should the ends of the master ring fail to meet evenly, the locater at 18 is moved against the ring and adjusted until the ring ends come in line whereupon the wing nut at 19 is tightened to provide a fixed location of the locater 18. The length of the band is adjusted by operation of the clamp at 52; and the aim is to adjust the band so that the reading on the scale 27 will come conveniently close to the light window. This is very desirable as it enables the operator to watch the gap opening and read the tension indicated simultaneously. The tension of the master ring is then weighed by turning the hand knob to bring the ring gap to a very nearly closed position such that the light is just visible between the ends of the ring. The ring is held in this position and the tension on the scale is noted for it is to such indicated tension on the scale that the production rings to be tested should substantially conform.

For checking ring tension by the other method at the bore diameter, a master disk such as indicated at 75 in Fig. 7, for each of the sizes in exterior diameter of the rings to be tested is required, and in the use of my invention such disk at one point in its periphery is provided with a recess or notch, as at 76. In setting the machine for a selected size of ring, a disk for such size is placed on the face of the upper portion 4 of the machine, as in Fig. 3, the locater 18 having been moved out of the way and the member 13 elevated to its uppermost position. The disk is placed in position with the recess 76 at the window at 9. The location of the disk should be central of the upper face portion 4 and this can be judged by the slots or lines at 12 so as to be substantially accurate. The disk is encircled with the band 46 and the locater 18 moved to a position and adjusted in such position with the disk in its central position. The band is tensioned with a tension of the average ring to be checked. For example, if a ring tension is from four to six pounds the tension on the band should be about five pounds. Such band tension is maintained and while maintained the block 56 is adjusted on its arcuate support 54 until the contacts 63 and 64 come together, it being understood that prior to these operations the switch 74 has been moved to the "off" position, or from post 70 to post 68. When the engagement of the contacts 63 and 64 takes place the light 10 will be lighted whereupon the block 56 is secured in place by tightening the nut at 57. The final and very accurate adjustment is performed by the screw 59. Such final adjustment with the tension on the band still maintained should be with great care and should be stopped when the tension maintained the light stays on. The contact is sensitive such that a movement of one thousandth of an inch either way of the scale head will break the circuit and the light will go out. When properly set with the light on, the rings will be within a plus or minus .0005 inch of bore diameter. After the machine is set the rings are tested one after another by placing them in position using the right hand and holding the ring against the anchor pin for the band at 47 with the gap in the ring substantially centrally located with respect to the window at 9. The ring gap is closed by turning the hand knob 33 in the proper direction. When the bore diameter is reached in this operation, the light will come on. The tension read is taken when the light flashes on.

With this construction a much better and more accurate testing of piston rings by either of the methods described can be obtained. The adjustable plate 13 with the pin 17 thereon is an aid in holding the band from springing away from the face of the machine while the pins 21 hold it against springing diametrically outward. The ring is contracted substantially around its entire periphery. A previous method, known as the diametric method of testing ring tension, is to place a ring between two compression posts which may move toward each other, one being located at each side of the ring diametrically opposite and with the gap in the ring substantially 90° from each of the posts. Such method results in a tension reading of one-half of the ring circumference only and distorts the ring out of its circular form because of only a two-point application of the contracting forces. Another method known as the link method is an attempt to better the diametrical method by placing the ring between a pair of jaws each of which carries spaced apart rollers to engage with the periphery of the ring at several spaced apart points.

While this is better than the diametrical method it requires a very expensive set of equipment, as there must be two very accurately machined jaws and contacting rollers thereon for each size and oversize of ring and the ring even in such case is not engaged all around but only at several spaced apart points.

This invention has been reduced to commercial, practical form and is very successful in its use and operation. The invention is defined in the appended claims and is to be considered comprehensive of all forms of structure coming within their scope.

I claim:

1. In a machine of the class described, a support having a substantially flat face against which a parted piston ring is adapted to be located, a band anchored at one end near the position of the ring parting and adapted to pass around the ring to adjacent the side of the parting and then substantially tangentially to and away from the ring, manually operable means mounted on said support for pulling upon the free end of the band to contract the ring to decrease the parting in said ring, and including means for indicating the degree of force required to contract said ring, a window in said support immediately back of the parting in said ring, and a light back of said window, said window and indicating means being in proximity to each other whereby the indicating means may be viewed simultaneously with the substantial closure of the ring parting.

2. In a machine of the class described, a support having a substantially flat face against which a parted piston ring to be tested may be placed, a window in said support immediately in front of which the parting in said ring is to be placed, a flexible inelastic band anchored at one end closely adjacent and to one side of the window, said band being adapted to encircle the piston ring and engage thereagainst substantially to the opposite side of the parting, a shaft on said support, a rocking member movably mounted on said shaft to which the other end of the band is adjustably connected, a second member mounted to turn upon the same shaft as said rocking member, an arm connected to said second member, a coiled spring connecting said arm and said rocking member, means for manually turning said second member to thereby tension said spring and pull upon the rocking member to exert a longitudinal pull upon said band, a movable indicator operably connected with said arm to move upon manually actuated movement thereof, and to scale over which the indicator moves, said scale being located in proximity to the window whereby when the ring is contracted to substantially closed position, said indicator will have come to a position substantially immediately below said window.

3. In a machine of the class described, a support having a substantially flat face located at an angle to the vertical against which a parted piston ring is adapted to be placed, a post mounted on said support extending in front of said face thereof, a roller mounted upon and extending in front of said face a short distance to one side of said post, a flexible inelastic band secured at one end to the post and adapted to extend upwardly and around a parted piston ring and thence to and over said roller with the parting in the piston ring disposed between the roller and the post, a member mounted to rock about an axis substantially perpendicular to said face of said support, means for adjustably connecting the free end portion of said band to said rocking member, means for manually moving said rocking member to pull upon said band including yieldable means connected to said rocking member, a scale carried on said rocking member, an indicator pivotally mounted on the rocking member having a free end portion movable over said scale, and means operated by said manually operable means for simultaneously moving the pointer over the scale with the operation of said rocking member to pull upon said band, as specified.

4. In a machine of the class described, a support having a substantially flat face inclined to the vertical against which a parted piston ring to be tested may be placed, a post attached to the support extending in front of said face, a roller mounted upon and extending in front of said face a short distance to one side of said post, a flexible inelastic band secured at one end to the post and adapted to pass upwardly and around a parted piston ring and thence over said roller, manually operable means to which the other end portion of the band is adjustably connected, means for manually operating said manually operable means to exert a pulling force upon the band including yieldable means connected to said manually operable means, a window between the post and roller at the front of which the parting in the piston ring is adapted to be located, an adjustable locating member mounted upon the face of said support to one side of the band having one end adapted to come against the band and a ring therewithin to locate the ring with the parting at said window, indicating means operated by the band pulling means including a movable pointer, and a scale over which the pointer moves, said scale being located immediately below said window, as specified.

5. In a machine of the class described, a support having a substantially flat face located in a generally upright position against which a parted piston ring is adapted to be placed, a flexible inelastic band anchored at one end at the lower portion of said face, said band being adapted to substantially encircle the piston ring and engage thereagainst at its outer curved surface, a rocking member located below said piston carrying face and mounted to move about an axis located substantially perpendicular to said face to which member the opposite end portion of the band is adjustably connected, an arm connected to the rocking member and extending therebelow, a second member mounted to turn about the same axis as said rocking member, a second arm connected to said second member extending downwardly and diverging from the first arm, a coiled spring connecting said arms, means for manually turning said second member to pull upon the rocking member through said spring to exert a longitudinal pull upon said band, a scale mounted upon said rocking member below the point of anchoring said band, a movable indicator pivotally mounted upon the first arm, a gear segment connected with said indicator and a rack bar connected to the second arm engaging with said gear segment, as specified.

6. In a machine of the class described, a support having a substantially flat face at its upper portion located in a generally upright position against which a parted piston ring to be tested is adapted to be placed, a window in said support at the lower portion of said face immediately in front of which the parting in said ring is to be placed, an anchoring post connected to the support extending forwardly from said face thereof adjacent and to one side of said window, a roller mounted upon said support at the lower portion of said face located a short distance from the post and to the opposite side of said window, a flexible inelastic band secured at one end to said post adapted to pass around the piston ring and over said roller, a rocking member to which the other end portion of the band is adjustably connected mounted to turn upon an axis located at the lower portion of said support, said axis being substantially perpendicular to the plane of said supporting face, said rocking member having an arc shaped upper portion above said axis and a depending weighted portion below the axis, a plate carrying a scale thereon secured to the upper portion of the rocking member, an arm connected to the lower part of said rocking member and extending therebelow, a second member mounted to turn about the same axis as the rocking member located in front thereof, a second arm connected to the second member extending downwardly and diverging from the first arm, a coiled tension spring located between and connected at opposite ends to the ends of said arms, a gear segment pivotally mounted upon the first arm, a rack bar connected at one end to the second arm, extending to and meshing with said gear segment, an indicator pointer connected to said gear segment extending upwardly to move over said scale, said scale being located in proximity to said window, and an electric circuit containing a light, said light being mounted upon the support back of the window.

7. A construction containing the elements defined in claim 6, combined with an annular gear secured to said second member, a plate fixed to the front end of said supporting axis for said rocking and second member, a shaft mounted on and extending through said plate, a pinion on one end of the shaft engaging with the annular gear and a hand wheel for manually turning the shaft secured to the forward end thereof.

8. In a machine of the class described, a support having a substantially flat face at its upper portion located in a generally upright position against which a parted piston ring to be tested is adapted to be placed, a window in said support at the lower portion of said face immediately in front of which the parting in said ring is to be placed, a flexible inelastic band anchored at one end closely adjacent and to one side of the window, said band being adapted to engage therearound substantially to the opposite side of the parting, an electric light back of the window carried by the support, an electric circuit for said light having a movable switch therein for completing and breaking said circuit, a shaft fixed to said support toward the lower portion thereof and extending outwardly, a member mounted for rocking movement on said shaft below the face having an arc shaped upper portion over which the opposite end portion of the band passes, means for adjustably connecting the band to said rocking member, a second member mounted on said shaft for turning movement, an arm connected to said second member, a spring connected to one end of said arm and at the other end to said rocking member, means for manually operating said second member to thereby, through the spring, rock said rocking member and pull upon the band to contract it around a parted piston ring, a scale carried by said rocking member, a movable pointer carried by said rocking member, means between said pointer and said arm for moving the pointer over the scale simultaneously with the tensioning of said band, an electric contact mounted on said rocking member and insulated therefrom, and a second electric contact mounted upon the support and insulated therefrom, said contacts being brought together upon rocking the rocking member to a predetermined position, and a second electric circuit having a break therein adapted to be closed by said switch when it is moved away from its closing position for the first circuit whereby said electric light will be lighted when said contracts are brought together.

9. A construction containing the elements in combination defined in claim 8, combined with a pivoted member carrying the second contact and means for adjusting said pivoted member to different positions, said means being in said second circuit and said pivoted member bearing thereagainst, whereby on rocking said rocking member beyond said predetermined position at which said contacts are brought in engagement, the second circuit is broken by the movement of said pivoted member away from said adjusting means.

10. In a machine of the class described, means for supporting a parted piston ring in a generally upright position with the parting at the lower side of the ring, a flexible band anchored at one end on said supporting means near one end of the parting, said band substantially encircling the ring nearly to the opposite end of its parting, manually operable means for pulling upon said band to contract the ring, indicating means including a movable pointer and a scale over which the pointer moves operated by said band pulling means, a window in said support, in front of which the parting in said ring is to be placed, a light behind said window, an electric circuit in which said light is included, and contact points in said circuit operated by said manually operable means for closing the circuit on contraction of said band and ring to a predetermined position.

11. In a machine of the class described, means for supporting a parted piston ring in a generally upright position, a window in said support in front of which the parting in said ring is to be placed, a light behind said window, a flexible inelastic band anchored at one end on said supporting means adjacent and to one side of the window, said band encircling the piston ring, manually operable rocking means pivotally mounted on said supporting means to which the other end portion of the band is adjustably connected, counter-balancing means on said rocking means to maintain it normally in a predetermined position, means for manually operating said rocking means to tension the band around the ring, a scale located adjacent and below the window and a pointer movable over said scale, means for operating said pointer by and simultaneously with said manually operable means, and an electric circuit in which said electric light is included having a switch to close or break said circuit.

12. A construction containing the elements in combination defined in claim 11, combined with an electric contact carried by said manually operable rocking means, a second electric contact carried by said support, said contacts being brought together upon rocking said rocking member a predetermined amount, and a second electric circuit in which said contacts are included, said second electric circuit being closed by the movement of said switch to a position to break the first electric circuit and being opened by the movement of said switch to close the first electric circuit.

HOLLY M. OLSON.